United States Patent [19]

Fukuyama

[11] Patent Number: 4,959,454

[45] Date of Patent: Sep. 25, 1990

[54] SPIRO(BIS)INDANE POLYETHERSULFONES AND METHOD FOR THEIR PREPARATION

[75] Inventor: James M. Fukuyama, Clifton Park, N.Y.

[73] Assignee: General Electric Company, Schenectady, N.Y.

[21] Appl. No.: 354,000

[22] Filed: May 19, 1989

Related U.S. Application Data

[63] Continuation-in-part of Ser. No. 146,154, Jan. 20, 1988.

[51] Int. Cl.$^5$ .................. C08G 69/42; C08G 63/00; C08G 63/02
[52] U.S. Cl. .................. 528/352; 528/185; 528/190; 528/195; 528/298
[58] Field of Search .............. 528/352, 185, 190, 195, 528/298

[56] References Cited

U.S. PATENT DOCUMENTS

| | | | |
|---|---|---|---|
| 4,789,725 | 12/1988 | Guggenheim et al. | 528/201 |
| 4,808,754 | 2/1989 | Guggenheim et al. | 528/271 |
| 4,814,496 | 3/1989 | Guggenheim et al. | 62/466 |

*Primary Examiner*—John Kight, III
*Assistant Examiner*—P. Hampton-Hightower
*Attorney, Agent, or Firm*—William H. Pittman; James C. Davis, Jr.

[57] ABSTRACT

Linear polyethersulfones are prepared by ring-opening of a macrocyclic spirobiindane polyethersulfone oligomer composition. The ring-opening reaction is conducted in the presence of a basic reagent such as an alkali metal bisphenol salt, at a temperature in the range of about 300°–400° C.

9 Claims, No Drawings

SPIRO(BIS)INDANE POLYETHERSULFONES AND METHOD FOR THEIR PREPARATION

This application is a continuation-in-part of copending application Ser. No. 146,154, filed Jan. 20, 1988.

This invention relates to polyethersulfones, and more particularly to a novel class thereof and a method for their preparation.

Polyethersulfones are a class of known polymers containing aromatic moieties linked with both ether and sulfone groups. They are characterized by such properties as toughness, chemical inertness, and thermal and oxidative stability.

The polyethersulfones are generally prepared by the reaction of bis(chloroaryl) sulfones such as bis(4-chlorophenyl) sulfone with salts of dihydroxyaromatic compounds such as bisphenol A. The reaction is ordinarily conducted in solution in a dipolar aprotic solvent such as dimethyl sulfoxide or N-methylpyrrolidone. By reason of the necessity for a solvent, it is usually impossible to integrate the polymerization reaction with forming operations such as molding. Therefore, there is a need for a class of polyethersulfones which can be employed in reactive processing operations such as reaction injection molding, pultrusion and resin transfer molding.

By the present invention, there is provided such a class of polyethersulfones. Also provided is a method for their preparation from macrocyclic polyethersulfones, by a ring-opening reaction.

In one of its aspects, therefore, the invention includes compositions comprising linear polyethersulfones comprising structural units of the formula

wherein $A^1$ is a spiro(bis)indane moiety of the formula

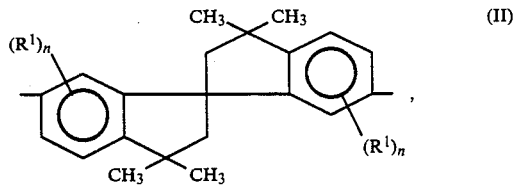

$A^2$ is an aromatic radical containing at least one —SO$_2$—group, each $R^1$ is independently $C_{1-4}$ primary or secondary alkyl or halo and n is 0–3.

In the units corresponding to formula I, the $A^2$ radical may be any aromatic radical which contains at least one sulfone group. Illustrative radicals of this kind are bis(4-phenylene) sulfone, which is usually preferred.

The spiro(bis)indane units of formula II are obviously derived from 6,6'-difunctional 3,3,3',3'-tetramethyl-spiro(bis)indanes (hereinafter sometimes simply "spirobiindanes"), which may be substituted or unsubstituted. The $R^1$ values therein may be alkyl radicals such as methyl, ethyl, 1-propyl or 2-propyl, or halo atoms such as chloro or bromo. Among compounds containing such $R^1$ values, methyl and chloro are preferred. However, the most preferred compounds are those in which n is 0.

Another aspect of the invention is a method for preparing a composition such as described hereinabove, which comprises contacting a composition comprising macrocyclic polyethersulfone oligomers of the formula

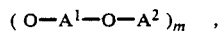

wherein $A^1$ and $A^2$ are as previously defined and m is from 1 to about 5, with a basic reagent at a temperature in the range of about 300–400° C.

The macrocyclic polyethersulfone oligomers may in turn be prepared by the reaction of a spirobiindane bisphenol of the formula HO—$A^1$—OH, optionally in admixture with at least one other dihydroxyaromatic compound, with a corresponding dihalo (preferably difluoro or dichloro) sulfone in the presence of a basic reagent such as potassium carbonate, which promotes the requisite nucleophilic aromatic substitution. Spirobiindane bisphenols have been discovered to be preferentially convertible to cyclic oligomers rather than linear polymers, under ordinary reaction conditions. The preferred spirobiindane bisphenol is 6,6'-dihydroxy3,3,3',3'-tetramethylspiro(bis)indane, (hereinafter "SBI"). A relatively high boiling dipolar aprotic solvent such as dimethyl sulfoxide is preferably employed, and suitable reaction temperatures are generally in the range of about 120°–180° C. Molar ratios of spirobiindane bisphenol to dihalo compound are generally 1:1 or very close thereto, and the amount of base is most often about 2.0–2.5 moles per mole of spirobiindane bisphenol.

The preparation of macrocyclic polyethersulfone oligomer compositions is illustrated by the following examples.

Example 1

To a mixture of 100 ml. of dimethyl sulfoxide, 50 ml. of toluene and 2.073 grams (20.9 mmol.) of potassium carbonate were added under nitrogen, with stirring, 2.543 grams (10 mmol.) of bis(4-fluorophenyl) sulfone and 3.084 grams (10 mmol.) of SBI. The mixture was heated at 140°–150° C. for 4 hours, cooled and poured into 400 ml. of methanol, whereupon the desired macrocyclic polyethersulfone oligomers precipitated as a white solid which was filtered and dried for 3 hours in a vacuum oven at 100° C. The yield was 4.73 grams (90% of theoretical).

Example 2

A reaction vessel fitted with a thermometer, septum cap and Dean-Stark trap fitted with a condenser was charged with 100 ml. of dimethyl sulfoxide, 50 ml. of toluene and 2.073 grams (20.9 mmol.) of finely ground potassium carbonate. A solution of 3.084 grams (10 mmol.) of SBI and 2.543 grams (10 mmol.) of bis(4-fluorophenyl) sulfone in 12-ml. of dimethyl sulfoxide was added at 140°–150° C., with stirring, over 2½hours. Heating was continued for 3 hours after which the toluene was removed by distillation and the mixture was cooled to room temperature and poured into 400 ml. of methanol. The product, comprising macrocyclic polyethersulfone oligomers, was separated by filtration and dried in a vacuum oven at 100° C. The yield was 4.073 grams (78% of theoretical). Field desorption mass spectrometric analysis showed the presence of the macrocyclic polyethersulfone dimer and trimer.

Examples 3–4

The procedure of Example 2 was repeated, substituting bisphenol A and 4,4'-dihydroxybiphenyl on an equimolar basis for half the SBI. The yields of macrocyclic oligomers were 76% and 65%, respectively, of theoretical.

The basic reagent used in the method of this invention is employed in a catalytic amount, typically about 0.5–2.0 mole percent based on macrocyclic oligomers. Suitable bases include alkali metal phenates, particularly di-(alkali metal) salts of bisphenols. Reaction temperatures of about 350°–400° C. are often preferred.

The preparation of the linear polymers of this invention is illustrated by the following examples.

Example 5

A toluene solution of 1 gram (1.9 mmol.) of the macrocyclic polyethersulfone oligomer product of Example 1 and 5 mg. (0.02 mmol.) of the disodium salt of bisphenol A was distilled to remove the toluene. The vessel containing the residue was heated in a salt bath at 380°–400° C. for 15 minutes and cooled to room temperature. The solid product was dissolved in chloroform and analyzed by high pressure liquid chromatography and gel permeation chromatography, which showed the presence of linear polyethersulfone having a weight average molecular weight of about 80,000.

What is claimed is:

1. A composition comprising linear polyethersulfones comprising structural units of the formula $$-O-A^1-O-A^2- \quad (I)$$

wherein $A^1$ is a spiro(bis)indane moiety of the formula

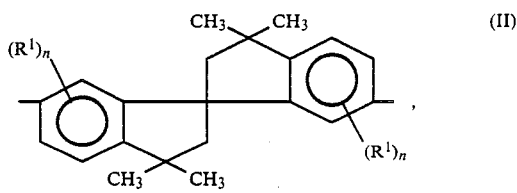

$A^2$ is an aromatic radical containing at least one $-SO_2-$ group, each $R^1$ is independently $C_{1-4}$ primary or secondary alkyl or halo and n is 0–3.

2. A composition according to claim 1 wherein n is 0.

3. A composition according to claim 2 wherein $A^2$ is bis(4-phenylene) sulfone.

4. A method for preparing a composition according to claim 1 which comprises contacting a composition comprising macrocyclic polyethersulfone oligomers of the formula

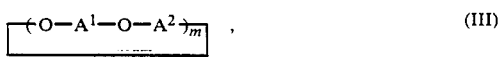

wherein $A^1$ and $A^2$ are as previously defined and m is from 1 to about 5, with a basic reagent at a temperature in the range of about 300°–400° C.

5. A method according to claim 4 wherein n is 0.

6. A method according to claim 5 wherein the basic reagent is employed in catalytic amount.

7. A method according to claim 6 wherein $A^2$ is bis(4-phenylene) sulfone.

8. A method according to claim 7 wherein the basic reagent is an alkali metal phenate.

9. A method according to claim 8 wherein the basic reagent is an alkali metal salt of a bisphenol.

* * * * *